(12) United States Patent
Song et al.

(10) Patent No.: US 10,229,342 B2
(45) Date of Patent: *Mar. 12, 2019

(54) IMAGE-BASED FEATURE DETECTION USING EDGE VECTORS

(71) Applicant: Nant Holdings IP, LLC, Culver City, CA (US)

(72) Inventors: Bing Song, La Canada, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,258

(22) Filed: Dec. 15, 2017

(65) Prior Publication Data

US 2018/0107894 A1   Apr. 19, 2018

Related U.S. Application Data

(63) Continuation of application No. 15/360,865, filed on Nov. 23, 2016, now Pat. No. 9,858,497, which is a (Continued)

(51) Int. Cl.
*G06K 9/00* (2006.01)
*G06K 9/48* (2006.01)
(Continued)

(52) U.S. Cl.
CPC ......... *G06K 9/481* (2013.01); *G06F 17/3028* (2013.01); *G06F 17/30256* (2013.01); (Continued)

(58) Field of Classification Search
CPC ......... G06T 7/0085; G06T 2207/10004; G06T 3/40; G06T 7/0083; G06K 9/4642
See application file for complete search history.

(56) References Cited

U.S. PATENT DOCUMENTS 6,711,293 B1   3/2004  Lowe
8,212,812 B2 *  7/2012  Tsin ................... G06F 17/5095
                                                            345/420
(Continued)

FOREIGN PATENT DOCUMENTS

WO   WO 2011/069021 A2   6/2011
WO   WO 2013/138846 A1   9/2013

OTHER PUBLICATIONS

International Search Report and Written Opinion for International Application No. PCT/US2015/029538 dated Jul. 31, 2015, 9 pages.
(Continued)

*Primary Examiner* — Li Liu
(74) *Attorney, Agent, or Firm* — Mauriel Kapouytian Woods LLP; Andrew A. Noble

(57) ABSTRACT

Techniques are provided in which a plurality of edges are detected within a digital image. An anchor point located along an edge of the plurality of edges is selected. An analysis grid associated with the anchor point is generated, the analysis grid including a plurality of cells. An anchor point normal vector comprising a normal vector of the edge at the anchor point is calculated. Edge pixel normal vectors comprising normal vectors of the edge at locations along the edge within the cells of the analysis grid are calculated. A histogram of similarity is generated for each of one or more cells of the analysis grid, each histogram of similarity being based on a similarity measure between each of the edge pixel normal vectors within a cell and the anchor point normal vector, and a descriptor is generated for the analysis grid based on the histograms of similarity.

33 Claims, 11 Drawing Sheets

Related U.S. Application Data continuation of application No. 15/199,267, filed on Jun. 30, 2016, now Pat. No. 9,542,593, which is a continuation of application No. 14/705,866, filed on May 6, 2015, now Pat. No. 9,412,176.

(60) Provisional application No. 61/989,445, filed on May 6, 2014.

(51) Int. Cl.

| | |
|---|---|
| G06T 3/40 | (2006.01) |
| G06K 9/46 | (2006.01) |
| G06K 9/62 | (2006.01) |
| G06T 5/40 | (2006.01) |
| G06T 7/13 | (2017.01) |
| G06T 7/143 | (2017.01) |
| G06T 7/181 | (2017.01) |
| G06F 17/30 | (2006.01) |
| G06T 7/246 | (2017.01) |

(52) U.S. Cl.
CPC ....... *G06K 9/00201* (2013.01); *G06K 9/4604* (2013.01); *G06K 9/4671* (2013.01); *G06K 9/48* (2013.01); *G06K 9/6212* (2013.01); *G06K 9/6214* (2013.01); *G06K 9/6215* (2013.01); *G06T 3/40* (2013.01); *G06T 3/403* (2013.01); *G06T 5/40* (2013.01); *G06T 7/13* (2017.01); *G06T 7/143* (2017.01); *G06T 7/181* (2017.01); *G06T 7/248* (2017.01); *G06T 2207/10004* (2013.01); *G06T 2207/10016* (2013.01); *G06T 2207/10028* (2013.01); *G06T 2207/10116* (2013.01); *G06T 2207/20076* (2013.01); *G06T 2207/20164* (2013.01); *G06T 2207/30004* (2013.01)

(56) References Cited

U.S. PATENT DOCUMENTS

| | | | | |
|---|---|---|---|---|
| 8,422,782 | B1* | 4/2013 | Dhua | G06K 9/4671 382/170 |
| 9,412,176 | B2 | 8/2016 | Song et al. | |
| 9,418,283 | B1* | 8/2016 | Natarajan | G06K 9/00463 |
| 9,424,461 | B1* | 8/2016 | Yuan | G06K 9/00201 |
| 9,542,593 | B2 | 1/2017 | Song et al. | |
| 9,858,497 | B2 | 1/2018 | Song et al. | |
| 2007/0217676 | A1 | 9/2007 | Grauman et al. | |
| 2008/0267508 | A1* | 10/2008 | Steffensen | G06K 9/48 382/199 |
| 2009/0208090 | A1 | 8/2009 | Nishiura et al. | |
| 2010/0310129 | A1* | 12/2010 | Hopfner | G06K 9/44 382/104 |
| 2011/0150344 | A1 | 6/2011 | Lee | |
| 2012/0212324 | A1* | 8/2012 | Pollard | G06K 9/00161 340/5.86 |
| 2012/0263388 | A1 | 10/2012 | Vaddadi et al. | |
| 2013/0315457 | A1* | 11/2013 | Beymer | G06T 7/0085 382/130 |
| 2015/0125835 | A1 | 5/2015 | Wittich et al. | |
| 2015/0227809 | A1 | 8/2015 | Alpert et al. | |
| 2015/0261803 | A1 | 9/2015 | Song et al. | |

OTHER PUBLICATIONS

Harris et al., "A Combined Corner and Edge Detector," The Plessey Company, 1988, pp. 147-152.

Mikolajczyk et al., "A Performance Evaluation of Local Descriptors," IEEE Transactions on Pattern Analysis and Machine Intelligence, 2005, vol. 27, No. 10, pp. 1615-1630.

Zitnick, "Binary Coherent Edge Descriptors," ECCV' 10 Proceedings of the 11th European conference on Computer vision, 14 pages.

"Edge Oriented Histograms in Global and Local Features," http://robertour.com/2012/01/26/edge-oriented-histograms-in-global-and-local-features/, Jan. 26, 2012, 14 pages.

Dalal et al., "Histograms of Oriented Gradients for Human Detection," International Conference on Computer Vision & Pattern Recognition (CVPR '05), 2005, 8 pages.

Belongie et al., "Shape Matching and Object Recognition Using Shape Contexts," IEEE Transactions on Pattern Analysis and Machine Intelligence, 2002, vol. 24, No. 24, pp. 509-522.

Belongie et al., "Shape Context: A New Descriptor for Shape Matching and Object Recognition," Advances in neural information processing systems, 2001, 7 pages.

\* cited by examiner

IMAGE-BASED FEATURE DETECTION USING EDGE VECTORS

CROSS REFERENCE TO RELATED APPLICATIONS

This application is a continuation of U.S. application Ser. No. 15/360,865 filed on Nov. 23, 2016, which is a continuation of U.S. application Ser. No. 15/199,267 filed on Jun. 30, 2016 (now U.S. Pat. No. 9,542,593 issued Jan. 10, 2017), which is a continuation of U.S. application Ser. No. 14/705,866 filed on May 6, 2015 (now U.S. Pat. No. 9,412,176), and claims the benefit of U.S. Provisional Application No. 61/989,445 filed May 6, 2014. These and all other extrinsic materials discussed herein are hereby incorporated herein by reference in their entirety. Where a definition or use of a term in an incorporated reference is inconsistent or contrary to the definition of that term provided herein, the definition of that term provided herein applies and the definition of that term in the reference does not apply.

TECHNICAL FIELD

This disclosure relates generally to image-based object recognition, and more specifically to feature identification techniques for image-based object recognition.

BACKGROUND

Various feature detection algorithms are used for image-based object recognition. At the most basic level, feature detection algorithms generate descriptors that provide a means to characterize, summarize and index distinguishing features of an image (e.g., shapes, objects, etc.) for purposes of image-based object recognition, search and retrieval. One example of a feature detection algorithm for image-based object recognition is the Scale Invariant Feature Transform (SIFT) feature detection algorithm, such as described in U.S. Pat. No. 6,711,293 to Lowe. For example, the SIFT feature detection algorithm may be applied to an image to generate descriptors for the numerous features within the image.

Machine-based object recognition generally comprises two distinct steps. First, training images of known objects are analyzed using a feature detection algorithm (e.g., a SIFT feature detection algorithm), which generates descriptors associated with features in the image data. Descriptors associated with many different objects can be packaged as a recognition library or database for deployment on a recognition device (e.g., a smartphone). Second, the recognition device captures a new "query" image of an object. The device applies the same feature detection algorithm to the query image, thereby generating query image descriptors. The device then compares the query image descriptors to the training image descriptors in the recognition library. If there are sufficient matches, typically nearest neighbor matches, then the query image is considered to contain a representation of at least one of the known objects.

SUMMARY

The various feature detection algorithms are generally based on different underlying philosophies. As such, certain descriptors may be particularly useful for certain object recognition situations. For example, some descriptors are generally efficient for describing features that track across frames of video data (e.g., FAST corners descriptors), while other descriptors are generally efficient for describing various object geometries. An ideal descriptor would be useful for multiple image-based object recognition purposes.

Many image recognition technologies have difficulty differentiating between texture-rich objects (e.g., an action figure toy or brick walls) and texture-poor objects (e.g., a solid-color field logo, metal slabs or sheets of glass) in a single image. For example, edge feature gradients can change substantially, e.g., from one video frame to another, such that absolute information (e.g., information obtained at only one point along the edge) may fail to account for relative information, e.g., information regarding a relationship between one part of an edge and another part of the edge. Rather than requiring multiple types of descriptors for object recognition, a single type of descriptor that can provide efficient image-based object recognition capabilities for texture-rich as well as texture-poor images would be advantageous.

Methods, systems and articles of manufacture for generating an edge-based feature descriptor for a digital image are described herein. The various embodiments can provide efficient image-based object recognition capabilities for texture-rich images as well as texture-poor images. In an embodiment, a plurality of edges are detected within a digital image. The digital image may be one of a video frame of a video stream and a rendered image. The plurality of edges may be detected based on one of tensor voting and a Canny edge detection algorithm. An anchor point located along an edge of the plurality of edges is selected. The anchor point may be a feature corresponding to at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature. An analysis grid associated with the anchor point is generated, the analysis grid including a plurality of cells. An analysis grid associated with the anchor point may have a geometric center at the anchor point, and may include one of a polar grid, a radial polar grid or a rectilinear grid. An anchor point normal vector comprising a normal vector of the edge at the anchor point is calculated. The anchor point normal vector may be one of a Harris matrix eigenvector or a geometric normal vector orthogonal to the edge at a pixel coordinate of the anchor point. One or more edge pixel normal vectors comprising normal vectors of the edge at one or more locations along the edge within the cells of the analysis grid are calculated. The edge pixel normal vectors may be one of a Harris matrix eigenvector or a geometric normal vector orthogonal to the edge at a pixel coordinate. A histogram of similarity is generated for each of one or more cells of the analysis grid, each histogram of similarity being based on a similarity measure between each of the edge pixel normal vectors within a cell and the anchor point normal vector, and a descriptor is generated for the analysis grid based on the histograms of similarity. Generating the descriptor may include concatenating data from the histograms of similarity for one or more of the cells of the analysis grid. An image-based object recognition search may be facilitated using the descriptor for the analysis grid.

In some embodiments, at least one degenerate edge may be eliminated from the plurality of edges.

In some embodiments, the digital image may be scaled by a scaling factor, and the plurality of edges may be detected within the scaled digital image. In some embodiments, the scaling factor may be at least 1.5. In some embodiments, the scaling factor may be at least 2.0.

In some embodiments, the anchor point may comprise a detected corner of the edge.

In some embodiments, the analysis grid may be oriented based on the anchor point normal vector.

In some embodiments, the analysis grid may comprise at least five cells. In some embodiments, the analysis grid may comprise at least nine cells.

In some embodiments, the similarity measure may be based on one of a relative angle or a dot product between each of the edge pixel normal vectors within a cell and the anchor point normal vector.

In some embodiments, the similarity measure may be based on a comparison between a magnitude of each of the edge pixel normal vectors within a cell and a magnitude of the anchor point normal vector. The magnitude of each of the edge pixel normal vectors within a cell and the magnitude of the anchor point normal vector may be based on a non-orientation based measurement.

In some embodiments, the similarity measure may be based on one or more weighting factors. The one or more weighting factors may be based on one of a Euclidean distance and a Gaussian weight.

In some embodiments, each histogram of similarity may include a plurality of bins. In some embodiments, each histogram of similarity may include at least four bins or at least 16 bins. Bin values for the plurality of bins may be normalized based on a maximum bin value, and may range between 0 and 255.

In some embodiments, a concatenation order may be determined for the data from the histograms of similarity. The concatenation order may be based on an orientation of the cells of the analysis grid relative to the anchor point normal vector.

In some embodiments, the descriptor may be a multi-dimensional vector having a number of dimensions based on a number of cells in the analysis grid. In some embodiments, the descriptor may be a multi-dimensional vector having a number of dimensions based on a total number of bins in the histograms of similarity for the analysis grid.

In some embodiments, a plurality of anchor points located along the edge may be selected, wherein the anchor points are equidistant along the edge with respect to each other. In some embodiments, a plurality of anchor points located along the edge may be selected in accordance with at least one of a determined distribution of analysis grids along the edge, a determined amount of analysis grids per unit area, a determined amount of analysis grids per unit volume, a selected object model, or depth field information associated with the digital image.

Various objects, features, aspects and advantages of the inventive subject matter will become more apparent from the following specification, along with the accompanying drawings in which like numerals represent like components.

Figure 1:
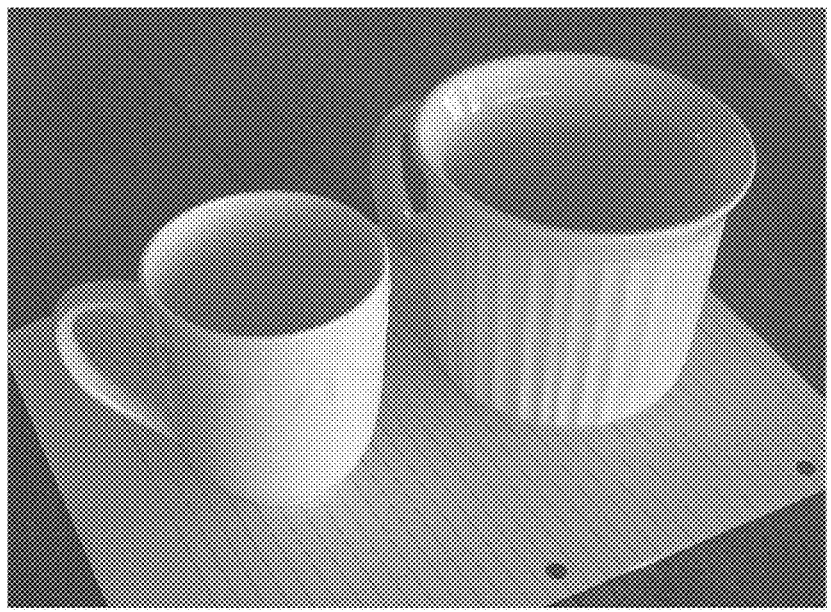
FIG. 1 illustrates an example of a digital image in accordance with an embodiment.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a," "an," and "the" includes plural references, and the meaning of "in" includes "in" and "on."

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing device structures operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

The focus of the disclosed inventive subject matter is to enable construction or configuration of a computing device to operate on vast quantities of digital data, beyond the capabilities of a human. Although, in some embodiments, the digital data represents images of objects, it should be appreciated that the digital data is a representation of the objects, not necessarily the objects themselves. By instantiation of such digital models or digital images in the memory of the computing devices, the computing devices are able to manage the digital data or models in a manner that could provide utility to a user of the computing device that the user would lack without such a tool. Thus, the disclosed devices are able to process such digital data in a more efficient manner according to the disclosed techniques.

One should appreciate that the disclosed techniques provide many advantageous technical effects including improving the scope, accuracy, compactness, efficiency and speed of digital image-based object recognition and retrieval technologies. It should also be appreciated that the following specification is not intended as an extensive overview, and as such, concepts may be simplified in the interests of clarity and brevity.

In accordance with the various embodiments, object instance retrieval, referred to herein in the context of image retrieval, image recognition and/or image-based object recognition, involves systems and methods of feature detection for an image dataset (referred to herein individually as "images" or "digital images") in response to a given query image. Image recognition is made possible through the use of descriptors that characterize, summarize and index distinguishing features of an image. Large-scale image recognition can involve multiple servers running in parallel and image datasets of 10 million or more images per server (relative to image datasets of about 1 million images per server for medium-scale image recognition). However, due to the storage requirements for the descriptors that correspond to large image datasets, there is often a tradeoff between the memory footprint of image descriptors and image retrieval performance as measured by, for example, mean average precision (mAP). Therefore, the use of fewer image descriptors to characterize images is preferable to perform image recognition on a large scale.

FIG. 1 illustrates an example of a digital image in accordance with an embodiment. In FIG. 1, digital image 100 illustrates an image or digital representation of one or more objects. Digital image 100 may be one of an infrared-filtered image, an x-ray image, a 360-degree view image, a synthetic image, a machine-view image, a frame of video data, a graphical rendering, a three-dimensional perspective-view of one or more objects, or other type of digital image. Digital image 100 also may illustrate a digital image that has been scaled, e.g., up-scaled or down-scaled, by a scaling factor. The one or more objects within digital image 100 may include any combination of texture-rich, medium texture or texture-poor objects including, for example, medical information, people, animals, plants, toys, buildings, products, bar codes, printed matter, or other types of objects.

In some embodiments, digital image 100 may be a portion of an image or a portion of a larger image structure (e.g., a cut out of an image, an image of a person's face extracted from a photograph of a group of people posted on a social media website, or a frame of a video sequence). For example, digital image 100 may be obtained by capturing a video frame of a video stream, such as via an image capture device or from a broadcast (e.g., television, movie, etc.).

Descriptors can be vectors that correspond to one or more distinguishable features of an image (e.g., shapes, objects, etc.). There are various methods for detecting image features and generating descriptors. For example, the scale-invariant feature transform (SIFT) is a currently popular image recognition algorithm used to detect and describe features of images. SIFT descriptors are 128-dimensions in order to be highly distinctive (i.e., distinguishable for matching purposes) and at least partially tolerant to variations such as illumination, three-dimensional (3D) viewpoint, etc. For example, one reference related to generating SIFT descriptors is D. Lowe, "Distinctive Image Features from Scale-Invariant Keypoints", International Journal of Computer Vision 60 (2), pages 91-110 (2004). In addition to SIFT descriptors, other alternative descriptors include Fast Retina Keypoint (FREAK) descriptors, Histograms of Oriented Gradient (HOG) descriptors, Speeded Up Robust Features (SURF) descriptors, DAISY descriptors, Binary Robust Invariant Scalable Keypoints (BRISK) descriptors, FAST descriptors, Binary Robust Independent Elementary Features (BRIEF) descriptors, Harris Corners descriptors, Edges descriptors, Gradient Location and Orientation Histogram (GLOH) descriptors, Energy of image Gradient (EOG) descriptors and Transform Invariant Low-rank Textures (TILT) descriptors. Typically, each image of an image dataset may include hundreds or thousands of features represented by descriptors. Therefore, practical system constraints will often require methods to both compress the amount of descriptors used to describe an image dataset, and to reduce in size the memory required to store the information contained in descriptors.

Edge-based feature descriptors may be advantageous for providing efficient image-based object recognition capabilities for various (e.g., texture-rich, texture-poor) digital images. For example, an edge detection algorithm may be applied to detect a plurality of edges within a digital image, such as digital image 100. An anchor point located along an edge of the plurality of edges may be selected, and an analysis grid including a plurality of cells associated with the anchor point may be generated. An edge-based feature descriptor for the analysis grid may then be determined based on histograms of similarity between edge information at an anchor point, and edge information within the cells of the analysis grid associated with the anchor point. As such, a library of edge-based feature descriptors for digital image 100 may be associated with known objects (e.g., people, buildings, vehicles, bar codes, printed media, etc.) to facilitate an image-based object recognition search.

Figure 2:
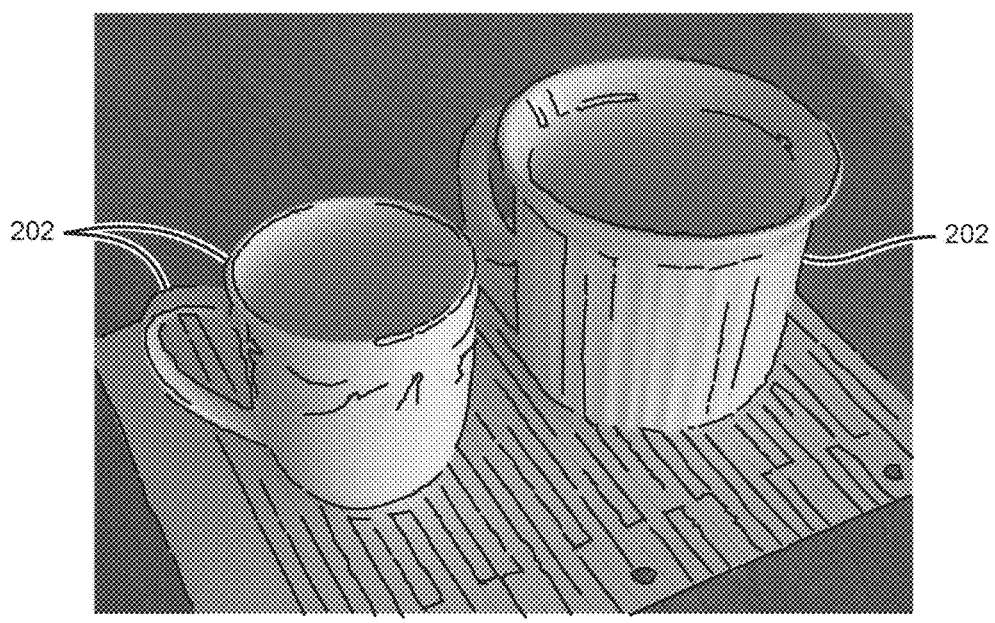
FIG. 2 illustrates an example of a plurality of edges detected within a digital image in accordance with an embodiment.

FIG. 2 illustrates an example of a plurality of edges detected within a digital image in accordance with an embodiment of the disclosed subject matter. As shown in FIG. 2, digital image 200 may include a plurality of edges, e.g., edges 202. The plurality of edges 202 may be detected within digital image 200 based on various edge detection techniques. In general, a goal of edge detection is to identify locations at which an image has discontinuities that are determined to be significant.

In an exemplary embodiment, the plurality of edges 202 may be detected by applying tensor voting concepts to digital image 200, e.g., to group edge pixels (i.e., edgels) to an edge. Tensor voting is a technique for extracting and grouping structures from a cloud of points, such as within a digital image. In general, tensor voting includes estimating saliency measurements of a likelihood that a point (e.g., an image pixel) lies on a surface, curve, or junction, or whether it is noisy, and is based on the propagation and aggregation of the most likely normal(s) encoded by means of tensors. In a first stage, a tensor is initialized at every point in the cloud either with a first estimation of the normal, or with a ball-shaped tensor if predetermined information is not available. Next, every tensor is decomposed into three components: a stick, a plate and a ball. Every component casts votes, which are tensors that encode the most likely direction (s) of the normal at a neighboring point by taking into account the information encoded by the voter in that component. The votes are then summed and analyzed to estimate surface, curve and junction measurements at every point. Points with low saliency are assumed to be noisy.

In another exemplary embodiment, the plurality of edges 202 may be detected by applying a Canny edge detection algorithm to digital image 200. In general, a Canny edge detection algorithm includes applying a Gaussian filter to smooth an image in order to remove noise, determining intensity gradients of the image, applying non-maximum suppression (e.g., an edge-thinning technique) to eliminate spurious responses to edge detection, applying a double threshold to determine potential edges, and tracking edges by hysteresis to finalize the edge detection by, for example, eliminating weak edges that are not connected to strong edges. As such, in various embodiments, a Canny edge detection algorithm may be used to detect edge pixels, while tensor voting concepts may be used to group edge pixels to an edge.

In some embodiments, a plurality of edges may be detected within digital image 200 by connecting one or more edgelets together to form an edge. For example, an edgelet may be represented by a circular arc having a radius of curvature, and each edgelet may include edgels (e.g., pixels in the image) that may be determined to be located along an edge.

In some embodiments, edge detection may include techniques that provide for scale invariance. For example, digital image 200 may be scaled by a scaling factor to extract sets of edges at each of a plurality of scales. Thus, digital image 200 may be down-scaled multiple times (e.g., by a factor of two) until a practical lower limit is reached. For example, scaling factors may include 1.5, 1.75, 2.25, 2.5, or other factors. In an embodiment, the scaling factor may preferably be at least 1.5, or at least 2.0, to provide for generally sufficient scale invariance and for greater computational efficiency relative to other scaling factors.

One skilled in the art will appreciate that while the edge detection techniques described herein are exemplary, various other edge detection techniques may be applied to determine a plurality of edges within a digital image. For example, exemplary systems and methods for edge detection are described in U.S. patent application Ser. No. 14/623,341, entitled "Edge-Based Recognition, Systems and Methods", filed on Feb. 16, 2015, which is incorporated in its entirety by reference herein. One skilled in the art will appreciate that certain edges, e.g., degenerate edge 208, within in digital image 200 may be eliminated from the plurality of edges to reduce noise. For example, singleton lines (e.g., circular arcs with very low curvature and having larger radii) that lack other edges close by may be eliminated from the plurality of edges due to, e.g., their lack of resolving power for an image-based object recognition search.

Figure 3A:
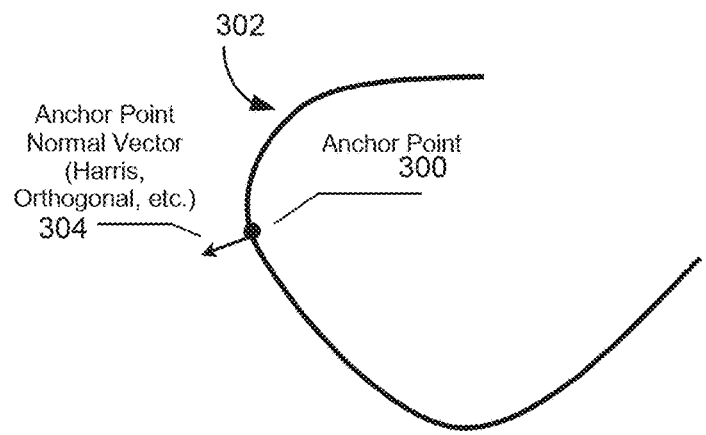
FIG. 3A illustrates an example of an anchor point selected in accordance with an embodiment.

FIG. 3A illustrates an example of an anchor point selected in accordance with an embodiment. In FIG. 3A, an anchor point 300 along edge 302 is selected within a digital image (e.g., digital image 200). For example, edge 302 may be one edge of a plurality of edges detected using an edge detection technique, such as described above. Anchor point 300 may be selected to be at any location (e.g., a pixel location) along edge 302. In an embodiment, anchor point 300 may be selected by utilizing a feature detection algorithm. For example, in some embodiments anchor point 300 may be a feature corresponding to at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature. Further, in some embodiments anchor point 300 may be selected to be located at a particular point of interest along edge 302. For example, anchor point 300 may be located at a detected corner of edge 302, or at another type of detected feature (e.g., an inflection point, a change in curvature of the edge above a threshold, etc.) along edge 302. In some embodiments, features such as detected corners may be of particular interest because they may be tracked during a real-time or frame-by-frame analysis of video streaming data. Also, features located at detected corners of an edge may include texture information related to the image data. As such, one skilled in the art will appreciate that an anchor point may be selected to be located at any point that is substantially along a detected edge, or within a threshold distance from a detected edge.

It should be appreciated that although FIG. 3A illustrates only one anchor point, a plurality of anchor points may be selected along edge 302, e.g., to generate a plurality of descriptors for an image. In some embodiments, a plurality of anchor points located along an edge may be selected in accordance with at least one of a determined distribution of analysis grids along the edge, a determined amount of analysis grids per unit area, a determined amount of analysis grids (as described below) per unit volume, a selected object model, or depth field information associated with the digital image. For example, a plurality of anchor points located along edge 302 may be selected as being equidistant along the edge with respect to each other.

In an embodiment, an anchor point normal vector 304 comprising a normal vector of the edge at the anchor point may be calculated. For example, anchor point normal vector 304 illustrates a normal vector, such as a unit normal vector, that includes information associated with edge 302 at anchor point 300. In an embodiment, anchor point normal vector 304 may be one of a Harris matrix eigenvector or a geometric normal vector orthogonal to the edge at a pixel coordinate of the anchor point. For example, anchor point normal vector 304 may correspond to a Harris matrix eigenvector that points from high brightness to low brightness, wherein the Harris matrix may be determined to have an average window size of, for example, nine pixels (i.e., the pixel coordinate of the anchor point and eight neighboring pixels) to reduce noise while maintaining computational efficiency. In another example, anchor point normal vector 304 may be a geometric normal vector that is substantially orthogonal to edge 302 at anchor point 300 (e.g., at a pixel coordinate associated with anchor point 300). For example, a geometric normal vector at anchor point 300 may be calculated based on radius of curvature information associated with edge 302, or based on radius of curvature information associated with edgelets or edgels of edge 302, if such information is available.

Figure 3B:
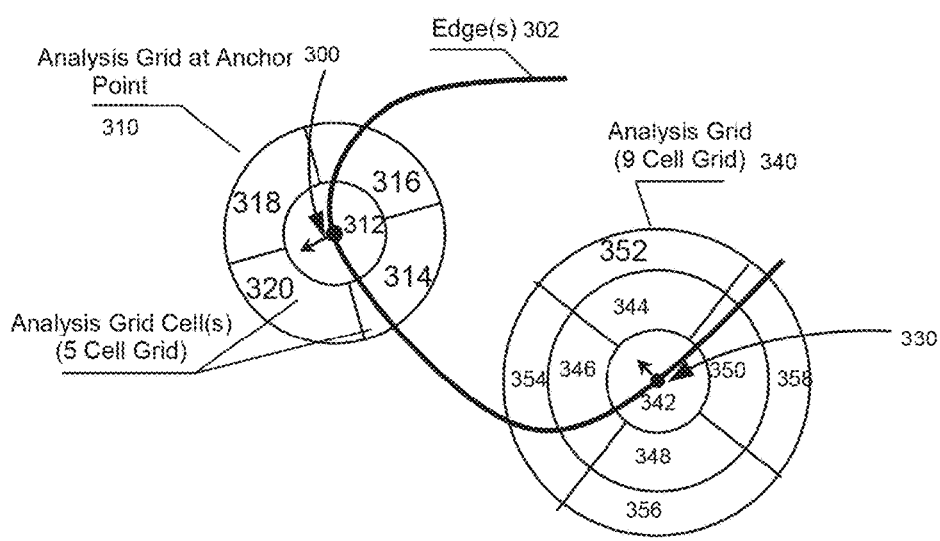
FIG. 3B illustrates an example of an analysis grid generated in association with an anchor point in accordance with an embodiment.

FIG. 3B illustrates an example of an analysis grid generated in association with an anchor point in accordance with an embodiment. In general, an analysis grid represents an artificial construct that may be used to analyze a curve in an area around an associated anchor point. For example, in FIG. 3B analysis grid 310 is associated with anchor point 300, while analysis grid 340 is associated with anchor point 330. In various embodiments, an analysis grid may be one of a polar grid, a radial polar grid or a rectilinear grid. For example, analysis grid 310 and analysis grid 340 are polar grids, or radially polar grids. In some embodiments, depending on a number of features identified on an edge, analysis grids may be evenly distributed for at least some of multiple anchor points along the edge. For example, a plurality of anchor points may be distributed such that they are equidistant along an edge from each other. The analysis grids corresponding to the plurality of anchor points may then be either overlapping or generated such that they are restricted from overlapping (such as shown). Further, the anchor points and corresponding analysis grids may be distributed evenly based on a desired number of analysis grids per unit area within a digital image, a desired number of analysis grids per unit volume within a 3D space (e.g., within a perspective view of a 3D object model), based on a predetermined (i.e., a priori known) object model or based on depth of field information derived from image data.

In an embodiment, an analysis grid may include a plurality of cells (i.e., divisions). For example, exemplary analysis grid 310 includes five cells (i.e., center cell 312 surrounded by arcuate cells 314, 316, 318 and 320), while analysis grid 340, also exemplary, includes nine cells (i.e., center cell 342, arcuate cells 344, 346, 348 and 350 in an inner shell, and arcuate cells 352, 354, 356 and 358 in an outer shell). It should be appreciated that an analysis grid may include any number of cells or divisions. As such, while an analysis grid including at least five cells, or including at least nine cells, is exemplary, various arrangements, configurations and numbers of cells are possible.

In some embodiments, an analysis grid, including the number of cells of therein, may be scaled based on one or more characteristics of an associated anchor point. For example, an analysis grid may be scaled based on a determined size of an associated anchor point, wherein the size of the associated anchor point may relate to one or more characteristics of a feature (e.g., a SIFT feature) associated with the anchor point. Therefore, analysis grids may be scaled proportionally with respect to their associated anchor points (and with respect to each other), such that the analysis grids within a digital image may be scale-invariant, e.g., with respect to different scaled versions of the digital image.

In an embodiment, an analysis grid may be oriented based on an anchor point normal vector. For example, analysis grid 310 and analysis grid 340 are oriented based on the anchor point normal vectors for anchor point 300 and anchor point 330, respectively. As a result, analysis grid 310 and analysis grid 340 may be rotationally invariant with respect to the anchor point normal vectors anchor point 300 and anchor point 330, respectively. Similarly, an analysis grid may have a geometric center at a location associated with an anchor point (e.g., a geometric center at a pixel coordinate associated with an anchor point).

Figure 4:
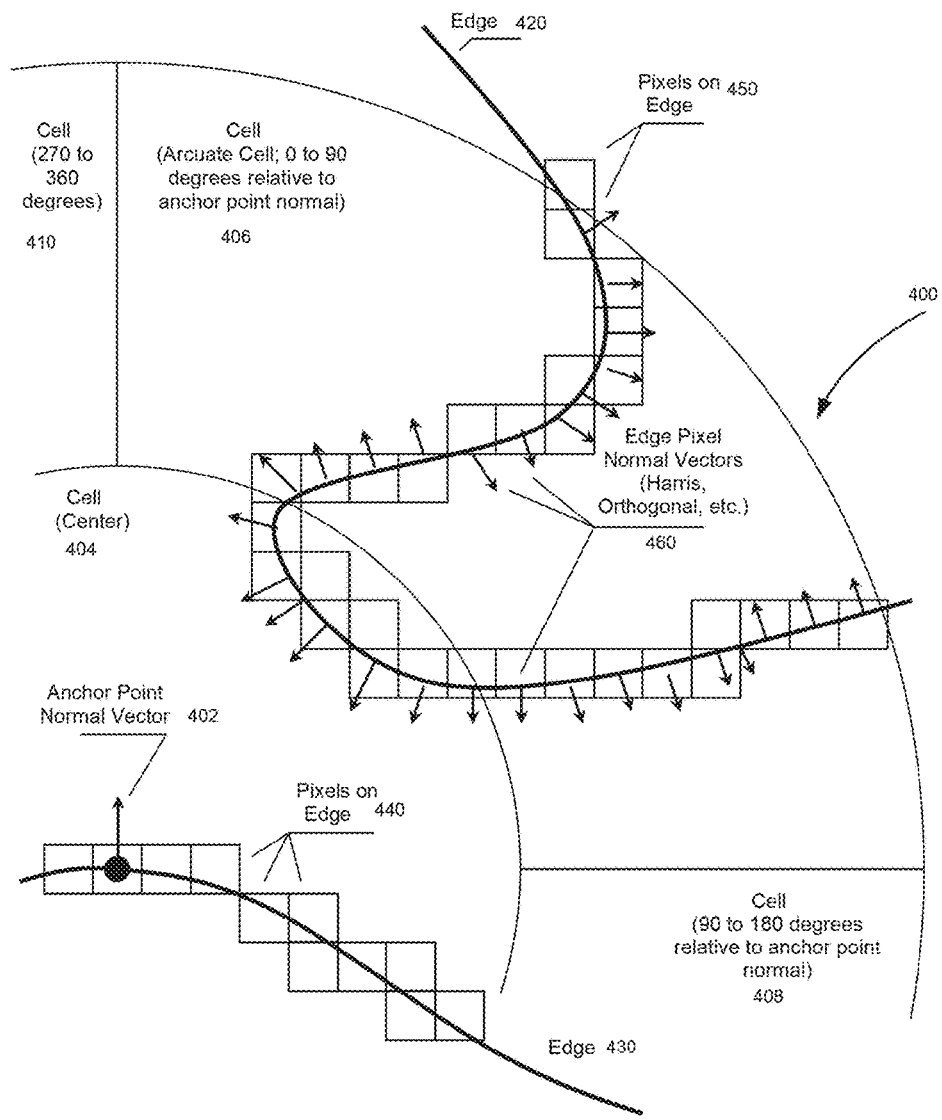
FIG. 4 illustrates an example of edge pixel normal vectors calculated within cells of an analysis grid in accordance with an embodiment.

FIG. 4 illustrates an example of edge pixel normal vectors calculated within cells of an analysis grid in accordance with an embodiment. FIG. 4 includes a close-up representation of a portion of a radial polar analysis grid 400, which is generally similar to analysis grid 310 in FIG. 3B. For example, analysis grid 400 is oriented based on anchor point normal vector 402 to provide orientation invariance. For example, such an alignment may be chosen to allow for a consistent representation of the analysis grid from feature-to-feature as well as to provide for a consistent method of calculating descriptors based on the embodiments herein.

Analysis grid 400 includes center cell 404, and arcuate cells 406-410. Other arcuate cells of analysis grid 400 are not shown for the sake of clarity. Further, the ordering of the cells within analysis grid 400, including center cell 404 (i.e., surrounding anchor point normal vector 402) and arcuate cells 406, 408 and 410 in an outer shell running in an angular arc of 0 to 90 degrees relative to anchor point normal vector 402, is one possible method of ordering cells in an analysis grid. However, the cell sizes (e.g., the radial distances in pixels) may be adjusted. As such, all practical cell sizes, configurations, orientations, or orderings may be employed in the various embodiments.

Edges 420 and 430 pass through analysis grid 400. Specifically, edge 420 passes through arcuate cell 406 and center cell 404, while edge 430 passes through arcuate cell 408 and center cell 404. It should be noted that edges that pass through more than one cell may increase the resolving power of a feature descriptor generated based on the embodiments herein. Further, the paths of edge 420 and edge 430, e.g., such as may be determined based on an edge detection technique, include a plurality of pixels 440 and 450, respectively, within analysis grid 400. For the sake of clarity only a small number of pixels are shown.

In an embodiment, edge information (e.g., curvature information from edgelets or a Harris matrix) may be used to calculate an edge pixel normal vector for each pixel that is located on an edge within the cells of an analysis grid, e.g., analysis grid 400. For example, an edge pixel normal vector 460 may be calculated for each edge pixel 450 along edge 420, wherein each of the edge pixel normal vectors 460 may be one of a Harris matrix eigenvector or a geometric normal vector orthogonal to edge 420 at a pixel coordinate.

Figure 5:
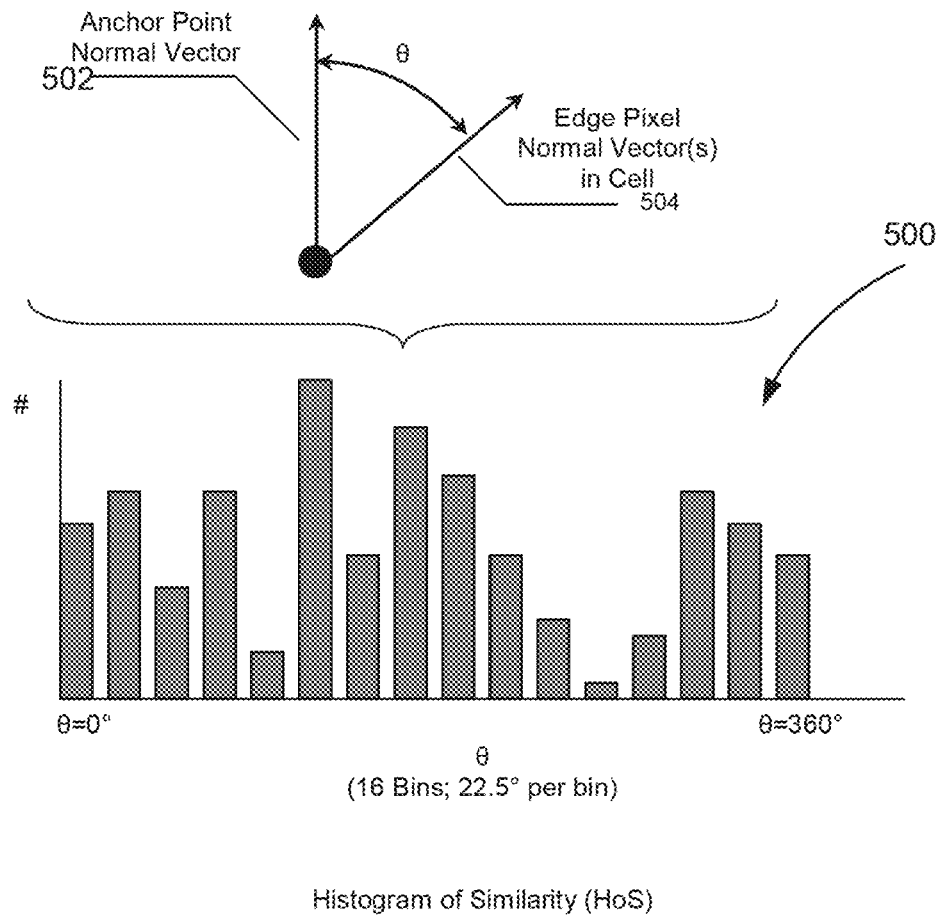
FIG. 5 illustrates an example of a histogram of similarity generated for a cell of an analysis grid in accordance with an embodiment.

FIG. 5 illustrates an example of a histogram of similarity generated for a cell of an analysis grid in accordance with an embodiment. A histogram of similarity 500 may be generated for each of one or more cells of an analysis grid. For example, five-cell analysis grid 310 in FIG. 3B may have a five-cell histogram of similarity (or a histogram of similarity with fewer cells), while nine-cell analysis grid 340 may have a nine-cell histogram of similarity (or a histogram of similarity with fewer cells).

In an embodiment, histogram of similarity 500 is based on a similarity measure between each of the edge pixel normal vectors within a cell and the anchor point normal vector. For example, the similarity measure may be a relative angle, $\theta$ (as shown), between an anchor point normal vector 502 and each of the edge pixel normal vectors, e.g., edge pixel normal vector 504. Thus, the similarity measure may be a relative angle ranging between 0 degrees and 360 degrees (i.e., 0 to $2\pi$ radians). In another example, the similarity measure may be based on a $\cos(\theta)$ or dot product between the anchor point normal vector and each of the edge pixel normal vectors. Thus, the similarity measure may be a dot product value ranging between −1 and 1. In preferred embodiments, the similarity measure will allow for a uniform distribution of values in a histogram of similarity in order to represent how similar the anchor point normal vector and each of the edge pixel normal vectors are relative to each other. As such, in preferred embodiments a histogram of similarity will represent information regarding the relative similarity between the anchor point normal vector and each of the edge pixel normal vectors, rather than absolute information (e.g., at pixel coordinate).

In some embodiments, the similarity measure may be based on additional vector information, such as a comparison between a magnitude of each of the edge pixel normal vectors within a cell and a magnitude of the anchor point normal vector. For example, the magnitude of each of the edge pixel normal vectors within a cell and the magnitude of the anchor point normal vector may be based on a non-orientation based measurement. As such, rather than having a normalized magnitude of one, each of the edge pixel normal vectors within a cell and the anchor point normal vector may include a magnitude based on, for example, various properties of the edge at a pixel location, including edge curvature information, color (e.g., relative RGB intensity) information, etc. Therefore, the similarity measure may represent a relative comparison of magnitudes, e.g., a log value of a ratio of vector magnitudes. For example, a log value of 0 (i.e., log(1)) may indicate vectors having identical magnitudes while positive or negative values may indicate differences in relative vector magnitudes.

In some embodiments, the similarity measure may be based on one or more weighting factors. For example, the similarity measure may be adjusted based on a Euclidean distance (d) between the anchor point and each of the edge pixels. In another example, the similarity measure may be adjusted based on a weighting factor that may include a factor of 1/Euclidean distance (d) or a Gaussian weight. One skilled in the art will appreciate that a variety of similarity measures may be employed. Therefore, the examples of similarity measures described herein, while exemplary, should not be construed as being limiting for the various embodiments.

A histogram of similarity may include a plurality of bins that are evenly spaced with respect to angular range. In an embodiment, a histogram of similarity preferably includes at least four bins, and more preferably at least 16 bins. However, it will be appreciated that a histogram of similarity may comprise any practical number of bins. For example, histogram of similarity 500 includes 16 bins evenly spaced (e.g., every 22.5 degrees) to cover a full range of possible angles between 0 degrees and 360 degrees. It should be appreciated that the amount and spacing of bins within a histogram of similarity may be adjusted to account for various factors, including resolving power during an image-based object recognition search and image-based object recognition search time.

In an embodiment, histogram of similarity bin values may be normalized so that they do not exceed a determined maximum value. For example, bin values may range between 0 and 255 for the values to be easily represented in a computer memory. As such, a bin value between 0 and 255 may be represented by a single byte, meaning that a 16 bin histogram of similarity may be represented by 16 bytes.

Figure 6:
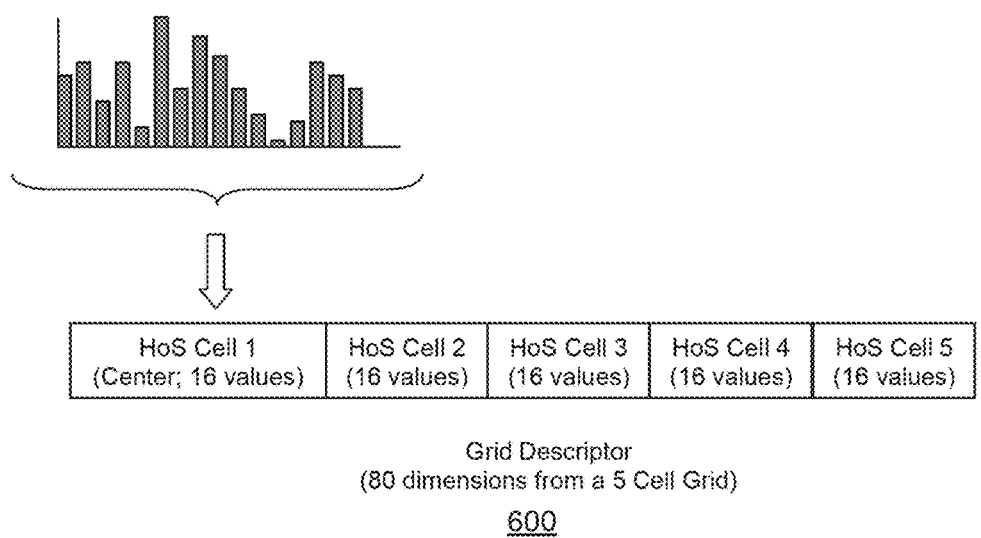
FIG. 6 illustrates an example of a descriptor generated for an analysis grid based on histograms of similarity in accordance with an embodiment.

FIG. 6 illustrates an example of a descriptor generated for an analysis grid based on histograms of similarity in accordance with an embodiment. For example, for a five-cell analysis grid (e.g., analysis grid 310 in FIG. 3B), grid descriptor 600 may be based on histogram of similarity information from each of the five cells. If each the histograms of similarity include 16 bins, then grid descriptor 600 would have 80 dimensions (i.e., 5*16). Likewise, for a nine-cell analysis grid (e.g., analysis grid 340 in FIG. 3B) where each cell's histogram of similarity includes 16 bins, the grid descriptor would have 144 dimensions (i.e., 16*9).

In an embodiment, grid descriptor 600 may be generated by concatenating data from the histograms of similarity for one or more of the cells of an analysis grid. As such, generating a grid descriptor may include determining a concatenation order for the data from the histograms of similarity. In some embodiments, the concatenation order may be based on an orientation of the cells of the analysis grid relative to the anchor point normal vector. For example, a concatenation of data from the histograms of similarity associated with analysis grid 310 may be ordered based on the relative orientation of the cells to the anchor point normal vector, such that the descriptor includes data from center cell 312 first, followed by data from cell 314, cell 316, cell 318 and cell 320. It will be appreciated that the data from the histograms of similarity may be arranged for concatenation in any of a variety ways, including, for example, ways that prioritize or deemphasize certain data (e.g., based on a principal component analysis (PCA) or other dimensional reduction technique). For example, a descriptor may be ordered such that certain of the data (e.g., histogram of similarity data associated with cell 320 in analysis grid 310) appears near the beginning of the descriptor, e.g., to maximize the resolving power of the data within the various histograms of similarity with respect to an image-based object recognition search, and/or to increase the robustness of the data with respect to certain affine transforms of an associated digital image.

Figure 7:
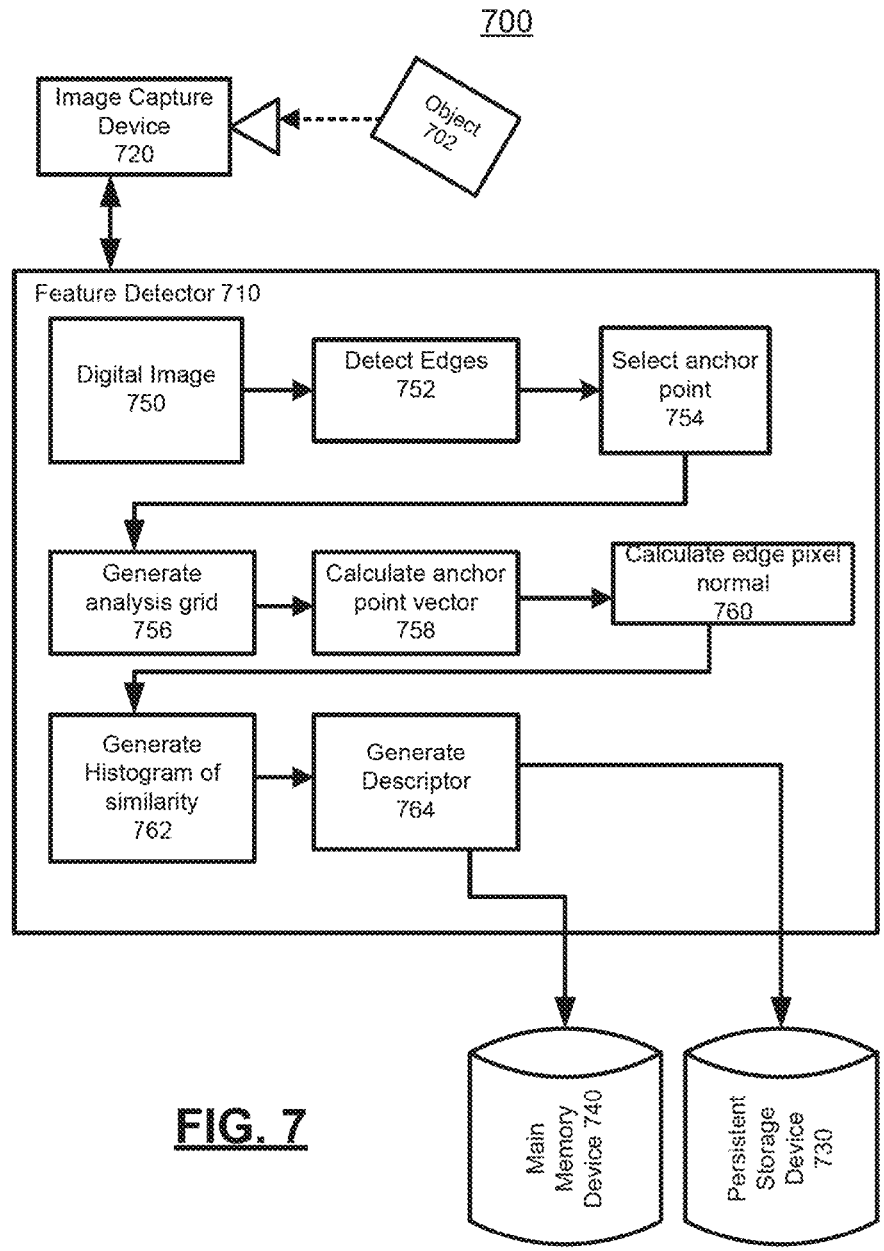
FIG. 7 illustrates a block diagram of a system for generating an edge-based feature descriptor for a digital image in accordance with an embodiment.

FIG. 7 illustrates a block diagram of a system for generating an edge-based feature descriptor for a digital image in accordance with an embodiment. In block diagram 700, elements for generating edge-based feature descriptors include a feature detector 710, image capture device 720, a persistent storage device 730 and a main memory device 740. However, it should be noted that the elements in FIG. 7, and the various functions attributed to each of the elements, while exemplary, are described as such solely for the purposes of ease of understanding. One skilled in the art will appreciate that one or more of the functions ascribed to the various elements may be performed by any one of the other elements, and/or by an element (not shown) configured to perform a combination of the various functions.

In an embodiment, feature detector 710 is configured to generate one or more edge-based feature descriptors for digital image 750. In some embodiments, digital image 750 represents a two-dimensional (2D) representation of an object 702, as may be found in a typical photograph, image, or video frame. Alternatively, digital image 750 may be a distorted image generated by utilizing atypical filters or lenses (e.g., a fish-eye lens). Moreover, digital image 750 may be a machine or robot-view of an object based on one or more of infrared (IR) filters, X-rays, 360-degree perspective views, etc. As such, digital image 750 may be one of an undistorted image, an infrared-filtered image, an x-ray image, a 360-degree view image, a machine-view image, a frame of video data, a graphical rendering and a perspective-view of a three-dimensional object, and may be obtained by capturing a video frame of a video stream via an image capture device, such as image capture device 720.

In some embodiments, image capture device 720 may be a device that is either external (as shown) or internal to feature detector 710 for generating or otherwise obtaining an image of object 702. For example, image capture device 720 may comprise a remote server (e.g., a Platform-as-a-Service (PaaS) server, an Infrastructure-as-a-Service (IaaS) server, a Software-as-a-Service (SaaS) server, or a cloud-based server), or a remote image database coupled to feature detector 710 via a communications network. In another example, image capture device 720 may include a digital still-image or video camera (e.g., CCD, CMOS or ultrasound optical sensor) configured to capture images and/or frames of video data. In another example, image capture device 720 may comprise a graphical rendering/modeling engine (e.g., a gaming system, image-rendering software, etc.) where the digital image is a generated image of an object rather than a captured image.

In an embodiment, feature detector 710 is configured to detect a plurality of edges 752 within digital image. For example, feature detector 710 may detect the plurality of edges based on one of tensor voting and a Canny edge detection algorithm. In another example, feature detector 710 may apply one or more methods for edge detection as described in U.S. patent application Ser. No. 14/623,341, entitled "Edge-Based Recognition, Systems and Methods", filed on Feb. 16, 2015, which is incorporated in its entirety by reference herein. In some embodiments, feature detector 710 may eliminate at least one degenerate edge from the plurality of edges. Further, in some embodiments, feature detector 710 may scale the digital image by a scaling factor, and the plurality of edges may be detected within the scaled digital image. For example, the scaling factor may be at least 1.5, or at least 2.0.

Feature detector 710 is further configured to select an anchor point 754 located along an edge of the plurality of edges. For example, feature detector 710 may apply a feature detection algorithm to detect a plurality of features within the digital images, and then select an anchor point from among the plurality of features determined to be located along an edge of the plurality of edges. As such, in some embodiments, the anchor point may be a feature corresponding to at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature. In some embodiments, the anchor point also may comprise a detected corner of an edge or other detected inflection point along an edge.

In some embodiments, feature detector 710 may be further configured to select a plurality of anchor points located along the edge, wherein the anchor points are equidistant along the edge with respect to each other. In some embodiments, the plurality of anchor points located along the edge may be selected in accordance with at least one of a determined distribution of analysis grids along the edge, a determined amount of analysis grids per unit area, a determined amount of analysis grids per unit volume, a selected object model, or depth field information associated with the digital image.

Feature detector 710 is further configured to generate an analysis grid 756, associated with the anchor point, and including a plurality of cells. For example, the analysis grid may have a geometric center at the anchor point, and may be one of a polar grid, a radial polar grid or a rectilinear grid. In some embodiments, feature detector 710 may be further configured to orient the analysis grid based on the anchor point normal vector, e.g., for purposes of orientation invariance.

Feature detector 710 is further configured to calculate an anchor point normal vector 758 comprising a normal vector of the edge at the anchor point. For example, the anchor point normal vector may be one of a Harris matrix eigenvector or a geometric normal vector orthogonal to the edge at a pixel coordinate of the anchor point.

Likewise, feature detector 710 is further configured to calculate one or more edge pixel normal vectors 760 comprising normal vectors of the edge at one or more locations along the edge within the cells of the analysis grid. The edge pixel normal vectors also may be one of a Harris matrix eigenvector or a geometric normal vector orthogonal to the edge at a pixel coordinate.

Feature detector 710 is further configured to generate a histogram of similarity 762 for each of one or more cells of the analysis grid, each histogram of similarity being based on a similarity measure between each of the edge pixel normal vectors within a cell and the anchor point normal vector. In some embodiments, the similarity measure may be based on one of a relative angle or a dot product between each of the edge pixel normal vectors within a cell and the anchor point normal vector. In some embodiments, the similarity measure may be based on a comparison between a magnitude of each of the edge pixel normal vectors within a cell and a magnitude of the anchor point normal vector. For example, the magnitude of each of the edge pixel normal vectors within a cell and the magnitude of the anchor point normal vector may be based on a non-orientation based measurement. The similarity measure also may be based on one or more weighting factors. For example, the one or more weighting factors may be based on one of a Euclidean distance and a Gaussian weight. In some embodiments, each histogram of similarity may include a plurality of bins, e.g., at least four bins or at least 16 bins. Further, feature detector 710 may be further configured to normalize bin values for the plurality of bins based on, for example, a maximum bin value (e.g., wherein the bin values are normalized to be within a range between 0 and 255).

Feature detector 710 is then configured to generate a descriptor 764 for the analysis grid based on the histograms of similarity. Generating the descriptor may include concatenating data from the histograms of similarity for one or more of the cells of the analysis grid. In some embodiments, feature detector 710 may be further configured to determine a concatenation order for the data from the histograms of similarity. For example, the concatenation order may be based on an orientation of the cells of the analysis grid relative to the anchor point normal vector. In some embodiments, feature detector 710 may be configured to store the descriptor in persistent storage device 730 and/or a main memory device 740 to, e.g., facilitate an image-based object recognition search.

Figure 8:
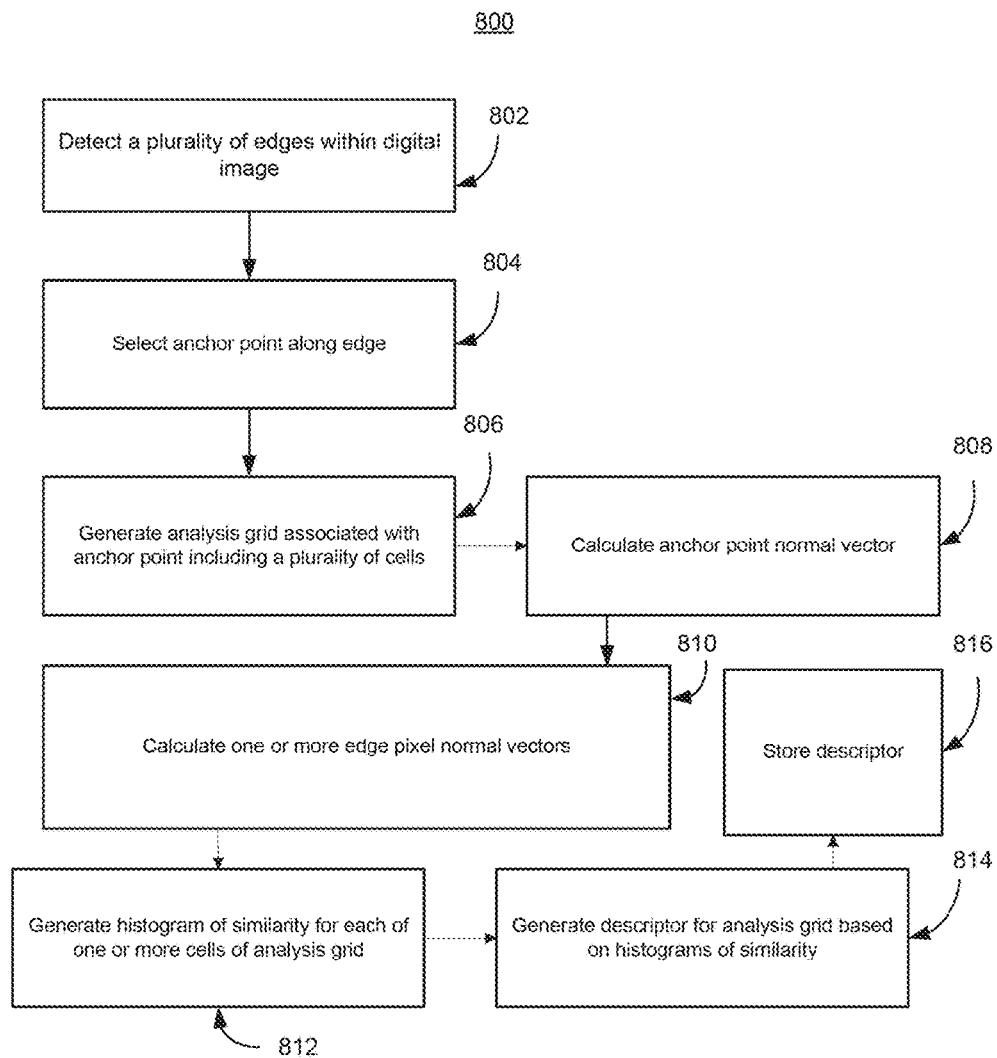
FIG. 8 illustrates a flow diagram of example operations for generating an edge-based feature descriptor for a digital image in accordance with an embodiment.

FIG. 8 illustrates a flow diagram of example operations for generating an edge-based feature descriptor for a digital image in accordance with an embodiment. It should be appreciated that method 800 is executed by one or more computing devices configured to or programmed to have the disclosed roles or responsibilities of a feature detector, such as feature detector 710. For example, the feature detector may comprise a computer server farm where each server is configured with, e.g., a SIFT-based image analysis package. Therefore, in some embodiments, the feature detector may ingest millions of digital images for processing according method 800. Further, the feature detector may include an image capture device (e.g., a video camera or a gaming console) equipped to capture image frames of video data according to method 800, such as in real-time.

At step 802, a plurality of edges are detected within the digital image. For example, the digital image may be one of a video frame of a video stream and a rendered image. The plurality of edges may be detected based on one of tensor voting and a Canny edge detection algorithm.

At step 804, an anchor point located along an edge of the plurality of edges is selected. The anchor point may be a feature corresponding to at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature.

At step 806, an analysis grid associated with the anchor point is generated, the analysis grid including a plurality of cells. The analysis grid may have a geometric center at the anchor point, and may include one of a polar grid, a radial polar grid or a rectilinear grid.

An anchor point normal vector comprising a normal vector of the edge at the anchor point is calculated at step 808. The anchor point normal vector may be one of a Harris matrix eigenvector or a geometric normal vector orthogonal to the edge at a pixel coordinate of the anchor point.

At step 810, one or more edge pixel normal vectors comprising normal vectors of the edge at one or more locations along the edge within the cells of the analysis grid are calculated. The edge pixel normal vectors may be one of a Harris matrix eigenvector or a geometric normal vector orthogonal to the edge at a pixel coordinate.

At step 812, a histogram of similarity is generated for each of one or more cells of the analysis grid, each histogram of similarity being based on a similarity measure between each of the edge pixel normal vectors within a cell and the anchor point normal vector, and a descriptor is generated for the analysis grid based on the histograms of similarity at step 814. Generating the descriptor may include concatenating data from the histograms of similarity for one or more of the cells of the analysis grid. At step 816, the descriptor may be stored, e.g., to facilitate an image-based object recognition search.

FIGS. 9-12 illustrate examples of digital images used to generate edge-based feature descriptors in accordance with an embodiment. In particular, FIGS. 9-12 illustrate that the embodiments herein may be utilized to generate edge-based feature descriptors that are useful for both texture-poor and texture-rich object recognition searches.

Figure 9:
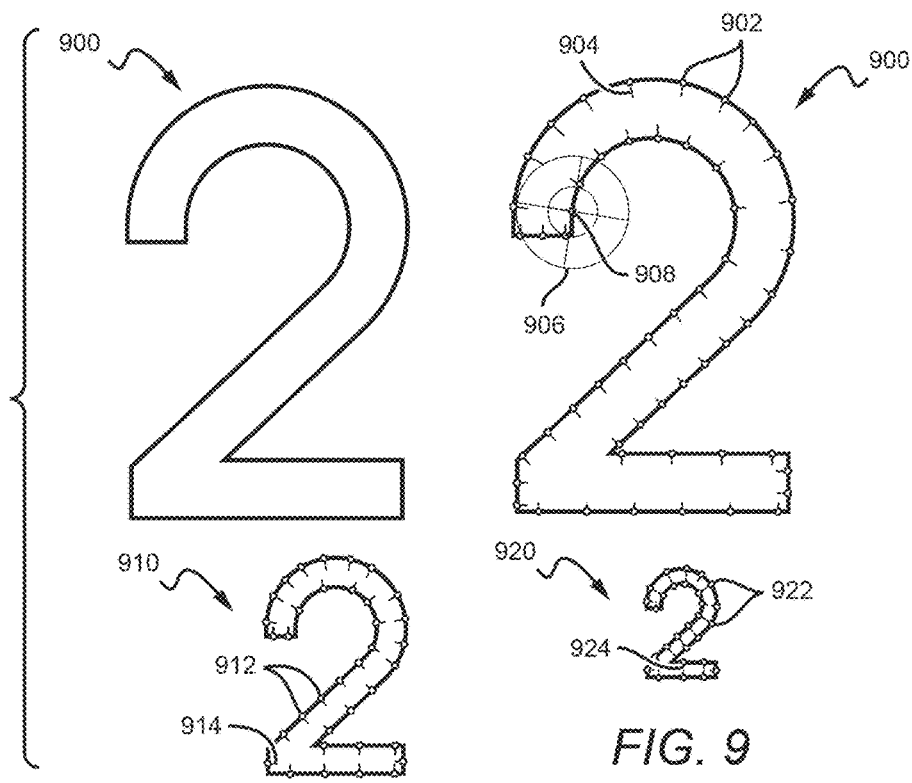
FIG. 9 illustrates an example of generating an edge-based feature descriptor for an image of a texture-poor object in accordance with an embodiment.

FIG. 9 illustrates an example of generating an edge-based feature descriptor for an image of a texture-poor object in accordance with an embodiment. In FIG. 9, digital image 900 illustrates an image of a texture-poor object (i.e., a number two). Image 910 illustrates an application of various embodiments herein to digital image 900. In digital image 910, a plurality of anchor points (e.g., anchor points 902) have been selected, and associated anchor point normal vectors (e.g., normal vectors 904) may be calculated for each of the anchor points. For example, normal vectors 904 may be Harris eigenvectors or unit normal vectors. One or more analysis grids, e.g., analysis grid 906, associated with the anchor points may be generated. For example, analysis grid 906 is a radial-polar analysis grid including a plurality of cells oriented based on the normal vector of anchor point 908. For example, a plurality of anchor points, and thus a plurality of analysis grids, may be substantially evenly distributed along the edges of digital image 910.

Digital Images 920 and 930 illustrate anchor points that have been selected at various scales of the original digital image 900. For example, digital image 900 may be scaled by a scaling factor, and a plurality of edges may be detected within the scaled digital images 920 and 930. In scaled digital image 920, a plurality of anchor points (e.g., anchor points 912) have been selected, and associated anchor point normal vectors (e.g., normal vectors 914) may be calculated for each of the anchor points. In scaled digital image 930, a plurality of anchor points (e.g., anchor points 922) have been selected, and associated anchor point normal vectors (e.g., normal vectors 924) may be calculated for each of the anchor points. As such, in an embodiment, edge-based feature descriptors may be generated for digital image 900 at a plurality of scales, e.g., to facilitate an image-based object recognition search. For example, edge-based feature descriptors based on analysis grids that are evenly distributed along the edges of scaled digital image 930 may provide a more compact set of feature descriptors for image 900 than, for example, a set of feature descriptors based on analysis grids that are evenly distributed along the edges of (unscaled) digital image 910. Therefore, generating edge-based featured descriptors for scaled digital images may enable more compact image recognition libraries, e.g., an image recognition library that is practical for storage on a mobile device.

Figure 10:
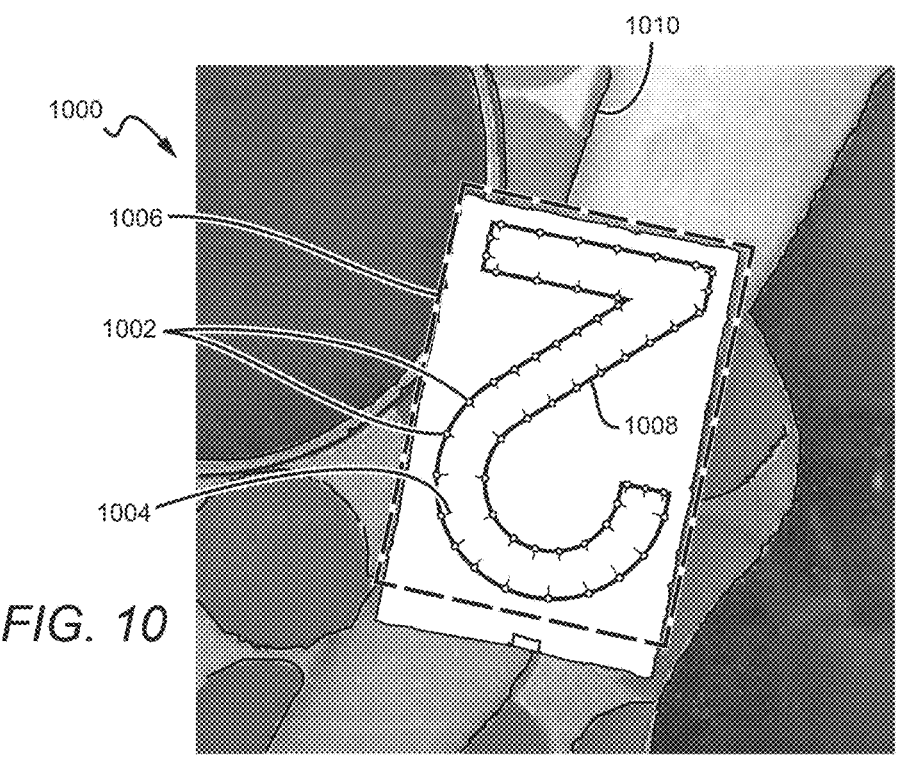
FIG. 10 illustrates an example of image-based object recognition for an image of a texture-poor object in accordance with an embodiment.

FIG. 10 illustrates an example of image-based object recognition for an image of a texture-poor object in accordance with an embodiment. In FIG. 10, edge-based feature descriptors (e.g., descriptors 1002) have been generated for a texture-poor image 1000 of an object, and associated normal vectors 1004 have been calculated. For example, image 1000 may be a screen capture from a feature detection device such as, e.g., a smartphone or a tablet computer. As shown, texture-poor image 1000 illustrates that the feature detection device has detected a plurality of edges, e.g., edges 1008 and 1010. However, the object number two has been recognized in texture-poor image 1000, as indicated by bounding box 1006. For example, edge-based feature descriptors, e.g., descriptors 1002, may be matched with stored edge-based feature descriptors generated from digital image 900. As shown, the edge-based feature descriptors generated for texture-poor image 1000 may be substantially evenly distributed along one or more detected edges of the image. Further, it should be noted that the edge-based feature descriptors generated based on radial-polar analysis grids oriented based on a normal vector of an anchor point, e.g., normal vector 1004, have allowed for correctly identifying the object number two within texture-poor image 1000 despite the change in orientation of the image in relation to digital image 900. It should also be noted that the degenerate edges (e.g., edges 1010) of image 1000 have been ignored for the purposes of feature detection.

Figure 11:
FIG. 11 illustrates an example of image-based object recognition for an image of a texture-rich object in accordance with an embodiment.

FIG. 11 illustrates an example of image-based object recognition for an image of a texture-rich object in accordance with an embodiment. FIG. 11 illustrates an example of a texture-rich object 1100 that may be recognized based on edge-based feature detectors generated based on the embodiments herein. For example, the texture-rich object 1100 may be a print ad including a plurality of features and textures, which may give rise to a plurality of edges. For example, edge-based feature descriptors, e.g., descriptors 1102, may be recognized based on stored edge-based feature descriptors generated from one or more digital images, as indicated by bounding box 1104. Thus, FIGS. 10 and 11 illustrate that the edge-based feature descriptors disclosed herein are adaptable to resolve both texture-poor objects as well as texture-rich objects in varied surrounding environments.

Figure 12:
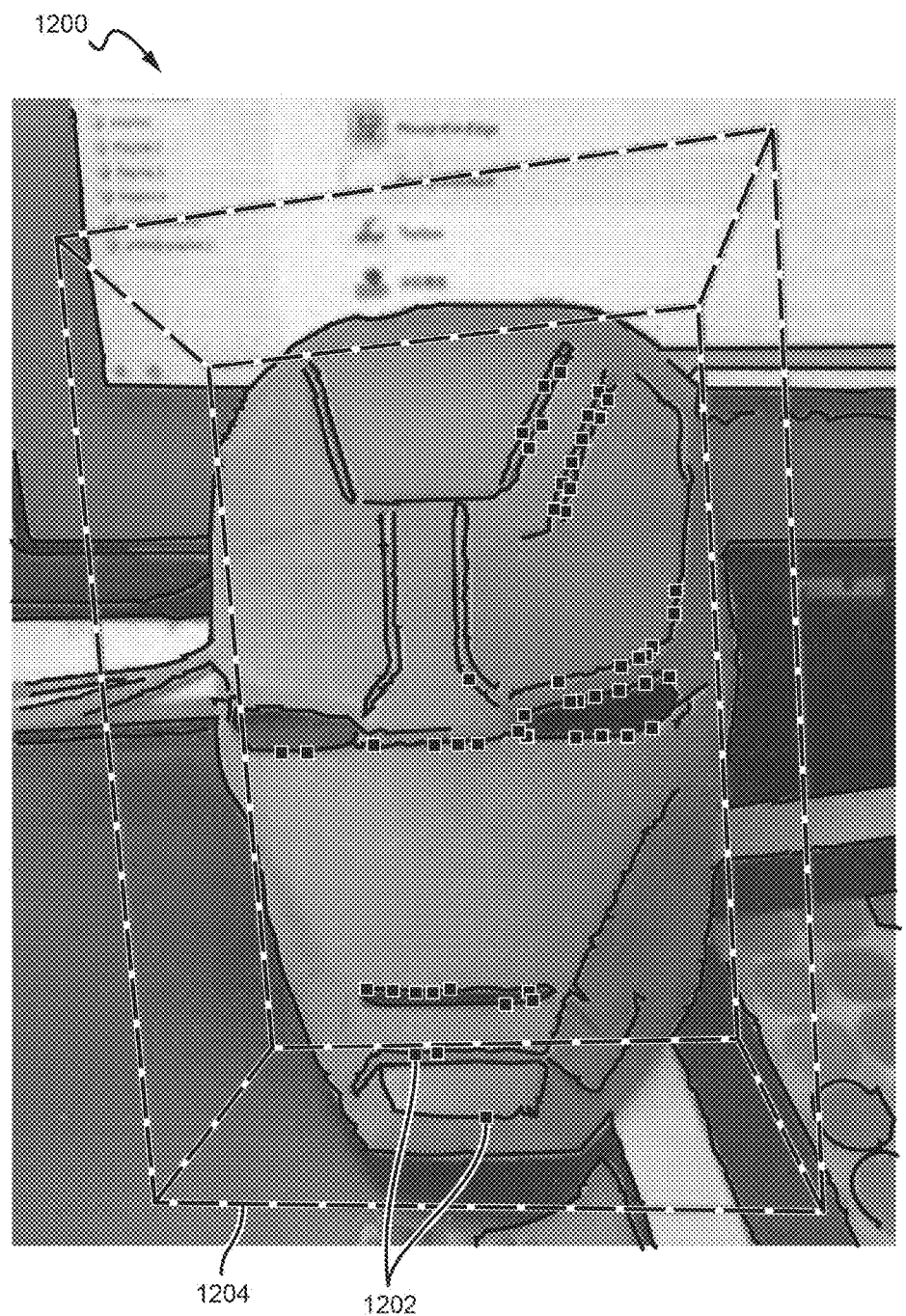
FIG. 12 illustrates an example of image-based object recognition for an image of a texture-poor three-dimensional object in accordance with an embodiment.

FIG. 12 illustrates an example of image-based object recognition for an image of a texture-poor three-dimensional object in accordance with an embodiment. The various embodiments may also be utilized for full 3D objects. For example, 3D objects (e.g., an action figure toy, a vehicle, etc.) may comprise different features when viewed from different perspectives. A video of a 3D object may be captured from different perspectives. The frames of the video may then be treated as digital images. In FIG. 12, the relative edge information of the edge-based feature descriptors described herein may be utilized to recognize low-texture 3D objects (in addition to 2D objects such as those illustrated in FIGS. 10 and 11). FIG. 12 illustrates a 3D texture-poor toy mask that includes relatively few observed features, e.g., features 1202, but 3D object may be recognized based on those features as indicated by 3D bounding box 1204 established around the mask. Further, in some embodiments a relationship may be determined between one or more of the detected edge features and a 3D structure of the object (e.g., such as may be determined during object ingestion) to calculate the dimensions of the recognized 3D object.

Therefore, the embodiments herein may be useful to address various efficiency, memory footprint and precision challenges associated with image-based object recognition.

In some embodiments, the generation of edge-based feature descriptors may be automated. For example, feature detector 710 and/or image capture device 720 may operate as a web bot that crawls web sites for images to ingest, e.g., images of people, social media profiles, etc. Further, the bot may operate on cityscape, streetscape or building interior images (e.g., Google® Street View images) or maps to generate edge-based feature descriptors associated with buildings, places or map features (e.g., a street grid pattern or topographical features). In some embodiments, feature detector 710 and/or image capture device 720 may be configured to generate of edge-based feature descriptors in real-time as images or videos are captured by a web bot, or another type of automated system.

Moreover, the entire infrastructure of large-scale image recognition systems, including the main memory and persistent storage devices, servers and user devices, can be made more efficient for processing image recognition queries due to the various embodiments.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 13:
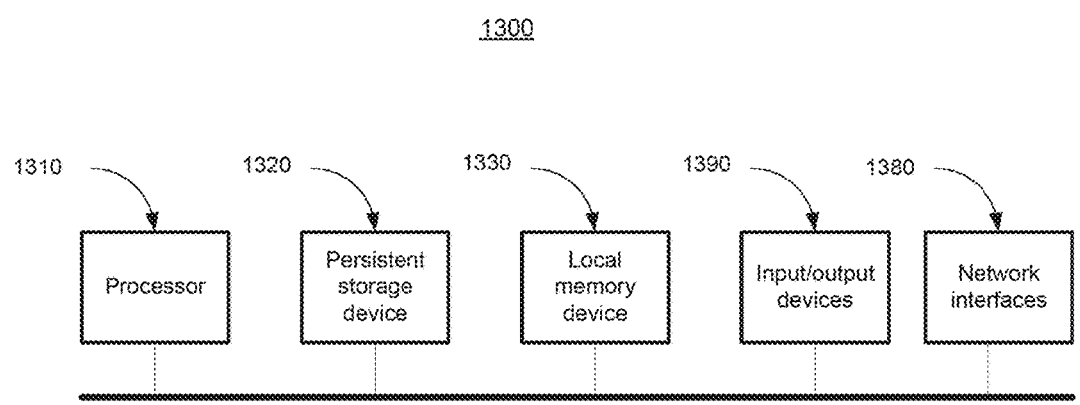
FIG. 13 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 13. Apparatus 1300 comprises a processor 1310 operatively coupled to a persistent storage device 1320 and a main memory device 1330. Processor 1310 controls the overall operation of apparatus 1300 by executing computer program instructions that define such operations. The computer program instructions may be stored in persistent storage device 1320, or other computer-readable medium, and loaded into main memory device 1330 when execution of the computer program instructions is desired. For example, feature detector 710 and image capture device 720 may comprise one or more components of computer 1300. Thus, the method steps of FIG. 8 can be defined by the computer program instructions stored in main memory device 1330 and/or persistent storage device 1320 and controlled by processor 1310 executing the computer program instructions. For example, the computer program instructions can be implemented as computer executable code programmed by one skilled in the art to perform an algorithm defined by the method steps of FIG. 8. Accordingly, by executing the computer program instructions, the processor 1310 executes an algorithm defined by the method steps of FIG. 8. Apparatus 1300 also includes one or more network interfaces 1380 for communicating with other devices via a network. Apparatus 1300 may also include one or more input/output devices 1390 that enable user interaction with apparatus 1300 (e.g., display, keyboard, mouse, speakers, buttons, etc.).

Processor 1310 may include both general and special purpose microprocessors, and may be the sole processor or one of multiple processors of apparatus 1300. Processor 1310 may comprise one or more central processing units (CPUs), for example. Processor 1310, persistent storage device 1320, and/or main memory device 1330 may include, be supplemented by, or incorporated in, one or more application-specific integrated circuits (ASICs) and/or one or more field programmable gate arrays (FPGAs).

Persistent storage device 1320 and main memory device 1330 each comprise a tangible non-transitory computer readable storage medium. Persistent storage device 1320, and main memory device 1330, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1390 may include peripherals, such as a printer, scanner, display screen, etc. For example, input/output devices 1390 may include a display device such as a cathode ray tube (CRT), plasma or liquid crystal display (LCD) monitor for displaying information (e.g., a plurality of image transformations for selection) to a user, a keyboard, and a pointing device such as a mouse or a trackball by which the user can provide input to apparatus 1300.

Any or all of the systems and apparatus discussed herein, including feature detector 710 and image capture device 720 may be performed by, and/or incorporated in, an apparatus such as apparatus 1300.

One skilled in the art will recognize that an implementation of an actual computer or computer system may have other structures and may contain other components as well, and that FIG. 13 is a high level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. An automated image-based feature detection apparatus, comprising:
    a digital image capturing device;
    a non-transitory computer-readable memory storing feature detection software instructions; and
    a processor coupled with the digital image capturing device and the memory, and configured to operate as a feature detector upon execution of the software instructions, wherein the feature detector is configurable to:
        obtain, via the digital image capturing device, digital image frames of a real-time video stream comprising digital images of a streetscape including a plurality of objects, wherein the plurality of objects includes at least one vehicle;
        detect a plurality of edges associated with at least one object of the plurality of objects within a plurality of frames of the digital image frames;
        track, in real-time across the plurality of frames, image features based on one or more anchor points associated with at least one edge of the plurality of edges;
        assign a vector for each of at least some points of a plurality of points along the at least one edge such that a plurality of vectors is associated with the at least one edge, wherein each anchor point of the one or more anchor points corresponds to a vector of the plurality of vectors, thereby defining an anchor point vector, and wherein each anchor point is associated with an analysis grid located on the at least one edge;
        generate a similarity measure as a function of relative measures between one of the anchor point vectors and at least some of the plurality of vectors within an analysis grid that corresponds to the one of the anchor point vectors; and
        enable a networked device to take an action associated with the at least one object as a function of the similarity measure.

2. The apparatus of claim 1, wherein the at least one object comprises at least one of a vehicle, a person, a building, printed media, and a barcode, a logo, an animal, a plant, a toy, a low-texture object, and a high-texture object located within the streetscape.

3. The apparatus of claim 1, wherein the at least one object is a three-dimensional object.

4. The apparatus of claim 3, wherein the digital image frames comprise images of the three-dimensional object captured from different perspectives.

5. The apparatus of claim 3, further comprising determining a relationship between one or more of the detected edge features and a structure of the three-dimensional object.

6. The apparatus of claim 1, wherein the one or more anchor points are selected based on at least one of a detected corner, an inflection point, and a change in curvature above a threshold along an edge.

7. The apparatus of claim 6, wherein the feature detector is further configured to select at least some of the anchor points for real-time tracking.

8. The apparatus of claim 6, wherein the one or more anchor points are selected in accordance with an object model.

9. The apparatus of claim 8, wherein the object model is selected based on one or more of a cityscape image, a streetscape image, map features, a street grid pattern, and topographical features.

10. The apparatus of claim 1, wherein the feature detector is further configurable to access a library of edge-based feature descriptors to associate objects within the streetscape with an object model.

11. The apparatus of claim 1, wherein the analysis grid is scaled based on one or more characteristics of an associated anchor point.

12. The apparatus of claim 1, further comprising distributing a plurality of analysis grids per unit area within the digital image frames.

13. The apparatus of claim 12, wherein the plurality of analysis grids is distributed evenly per unit volume within a three-dimensional space based on an object model and field of depth information derived from image data.

14. The apparatus of claim 1, wherein the digital image capture device is one of a sensor or a digital video camera configured to capture images or frames of video data.

15. The apparatus of claim 14, wherein the digital image capturing device comprises a plurality of sensors including at least one of a charge-coupled device (CCD) sensor, a complementary metal-oxide semiconductor (CMOS) sensor, and an ultrasound sensor.

16. The apparatus of claim 1, wherein the digital image capturing device comprises a graphical rendering or modeling engine.

17. The apparatus of claim 16, wherein the digital image frames comprise a generated graphical rendering or modeling of the streetscape.

18. The apparatus of claim 1, wherein the digital image frames comprise one or more of an image filtered based on electromagnetic radiation, a 360-degree view image, a synthetic image, a machine or robot view image, video data, a graphical rendering, and a three-dimensional perspective view.

19. The apparatus of claim 1, further comprising scaling the digital image frames based on a scaling factor.

20. The apparatus of claim 1, wherein the real-time video stream is from a broadcast.

21. The apparatus of claim 1, wherein the tracked image features comprise vectors that correspond to one or more distinguishable features of the at least one object.

22. The apparatus of claim 1, wherein the tracked image features include at least one of the following types of features: scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG), and Transform Invariant Low-rank Textures (TILT) features.

23. The apparatus of claim 1, wherein the feature detector is further configured to compress an amount of image features tracked across the plurality of frames.

24. The apparatus of claim 1, wherein the feature detector is further configurable to generate an analysis grid, wherein the analysis grid includes a plurality of cells associated with an anchor point.

25. The apparatus of claim 1, wherein detecting the plurality of edges comprises locating one or more discontinuities within the digital image frames.

26. The apparatus of claim 1, wherein detecting the plurality of edges comprises determining that at least one of the one or more discontinuities is significant based on at least one edge detection technique.

27. The apparatus of claim 26, wherein the at least one edge detection technique comprises one or more of a Canny edge technique, a tensor voting technique, and an edgelet connection technique.

28. The apparatus of claim 1, wherein the feature detector is further configurable to generate edge-based feature descriptors in real-time with respect to obtaining the digital image frames.

29. The apparatus of claim 1, wherein the feature detector is further configurable to track the digital images frame-by-frame within the digital image frames.

30. The apparatus of claim 1, wherein the plurality of vectors includes at least one of the following: an edge normal vector, an eigenvector, a Harris eigenvector, and a geometric normal vector.

31. The apparatus of claim 1, wherein the relative measures comprise at least one of the following: a dot product among vectors, a relative magnitude among vectors, a Euclidean distance, a normalization, and a Gaussian weight.

32. The apparatus of claim 1, wherein enabling the action comprises configuring the networked device based on the similarity measure.

33. An automated system for image-based feature detection, comprising:
   a digital image capturing device configured to obtain digital image frames of a real-time video stream comprising digital images of a streetscape including a plurality of vehicles; and
   a feature detector in communication with the digital image capturing device and configured to:
      detect a plurality of edges associated with at least one vehicle of the plurality of vehicles within a plurality of frames of the digital image frames;
      track, in real-time across the plurality of frames, image features based on one or more anchor points associated with at least one edge of the plurality of edges;
      assign a vector for each of at least some points of a plurality of points along the at least one edge such that a plurality of vectors is associated with the at least one edge, wherein each anchor point of the one or more anchor points corresponds to a vector of the plurality of vectors, thereby defining an anchor point vector, and wherein each anchor point is associated with an analysis grid located on the at least one edge;
      generate a similarity measure as a function of relative measures between one of the anchor point vectors and at least some of the plurality of vectors within an analysis grid that corresponds to the one of the anchor point vectors; and
      enable a networked device to take an action associated with the at least one vehicle based on the similarity measure.

* * * * *